United States Patent
Rawat et al.

(10) Patent No.: US 12,427,888 B2
(45) Date of Patent: Sep. 30, 2025

(54) DCFC SMART COOLING STRATEGY

(71) Applicant: GM GLOBAL TECHNOLOGY OPERATIONS LLC, Detroit, MI (US)

(72) Inventors: Sangam Rawat, Ferndale, MI (US); Davis H. Rossman, Oak Park, MI (US); Yanyan Zhang, Troy, MI (US); Kris Sevel, Rochester Hills, MI (US); Chetan Powar, Pune (IN)

(73) Assignee: GM Global Technology Operations LLC, Detroit, MI (US)

( * ) Notice: Subject to any disclaimer, the term of this patent is extended or adjusted under 35 U.S.C. 154(b) by 658 days.

(21) Appl. No.: 17/950,545

(22) Filed: Sep. 22, 2022

(65) Prior Publication Data
US 2024/0100990 A1 Mar. 28, 2024

(51) Int. Cl.
*H02J 7/00* (2006.01)
*B60L 50/60* (2019.01)
*B60L 53/00* (2019.01)
*B60L 58/12* (2019.01)
*B60L 58/26* (2019.01)
*H02J 7/14* (2006.01)

(52) U.S. Cl.
CPC ............... *B60L 58/12* (2019.02); *B60L 50/60* (2019.02); *B60L 53/00* (2019.02); *B60L 58/26* (2019.02); *H02J 7/0048* (2020.01); *H02J 7/007192* (2020.01)

(58) Field of Classification Search
CPC .......... B60L 58/12; B60L 58/26; B60L 53/00
USPC ....................................................... 320/134
See application file for complete search history.

(56) References Cited

U.S. PATENT DOCUMENTS

| | | | |
|---|---|---|---|
| 2005/0210662 A1* | 9/2005 | Li ................. | H01M 50/227 29/730 |
| 2008/0258677 A1* | 10/2008 | Lee ................. | H02J 7/02 320/101 |
| 2009/0296442 A1* | 12/2009 | Chang ............. | H02J 7/342 320/105 |
| 2012/0009457 A1* | 1/2012 | Lee ................. | B60L 50/64 429/120 |
| 2012/0244398 A1* | 9/2012 | Youngs ........... | H01M 10/625 429/61 |
| 2015/0037647 A1* | 2/2015 | Nguyen .......... | H01M 10/6555 429/120 |
| 2016/0221458 A1* | 8/2016 | Lopez ............. | B60L 53/16 |

(Continued)

*Primary Examiner* — Alexis B Pacheco
(74) *Attorney, Agent, or Firm* — Quinn IP Law

(57) ABSTRACT

A method, system, and motor vehicle for controlling a direct-current fast-charging process of a battery system are provided that significantly improves performance of the direct-current fast-charging process and minimizes condensation issues by utilizing lower coolant temperature for a short duration when a rechargeable energy storage system cell temperature is greater than a specific temperature threshold. The rechargeable energy storage system cell temperature, a rechargeable energy storage system state of charge a rechargeable energy storage system voltage, and a rechargeable energy storage system direct-current fast-charging current are utilized to determine when to utilize the lower coolant temperature when the rechargeable energy storage system cell temperature is greater than a specific temperature threshold instead of using a lower coolant temperature from the beginning of the direct-current fast-charging process.

20 Claims, 3 Drawing Sheets

(56) References Cited

U.S. PATENT DOCUMENTS

| | | | |
|---|---|---|---|
| 2016/0336578 A1* | 11/2016 | Mack | H01M 50/591 |
| 2017/0005371 A1* | 1/2017 | Chidester | H01M 50/20 |
| 2017/0232865 A1* | 8/2017 | Christen | B60H 1/00278 |
| | | | 429/120 |
| 2017/0327091 A1* | 11/2017 | Capizzo | B60L 53/68 |
| 2018/0072181 A1* | 3/2018 | Christen | B60L 58/26 |
| 2019/0077272 A1* | 3/2019 | Newman | B60L 58/19 |
| 2019/0214617 A1* | 7/2019 | Elison | H01M 50/298 |
| 2019/0283611 A1* | 9/2019 | Conlon | H02J 3/322 |
| 2020/0028223 A1* | 1/2020 | Berge | B60K 1/04 |
| 2020/0295418 A1* | 9/2020 | Choi | B60L 58/26 |
| 2021/0057694 A1* | 2/2021 | Zeiler | H01M 10/46 |

* cited by examiner

DCFC SMART COOLING STRATEGY

INTRODUCTION

The present disclosure is directed to electric vehicle (EV) battery systems in which one or more rechargeable electrochemical battery pack(s) are a component of a rechargeable energy storage system (RESS) and in which the RESS is connected to one or more electric propulsion motors and the one or more battery pack(s) is connected to one or more components, such as an EV battery system utilized to power propulsion functions as part of an electrified powertrain of a battery electric vehicle (BEV), plug-in hybrid electric vehicle (HEV), or other mobile system. Specifically, the present disclosure is directed to a direct-current (DC) fast-charging (FC) (DCFC) process for the RESS that provides a smart cooling strategy (SCS) that optimizes DCFC charging by varying coolant temperature (CT) based on RESS conditions and surrounding environment conditions.

When the electric propulsion motors are configured as polyphase/alternating current (AC) motors, various components, such as high voltage (HV) components, accessory power modules (APMs), onboard charging modules (OBCMs), air conditioning compressor modules (ACCMs), and other modules, are connected to the RESS and its battery pack(s) across opposing voltage bus rails of a DC voltage bus and powered by the RESS. Present battery electric systems (BESs) face challenges meeting DCFC requirements for energy gain due to excessive thermal derating. The CT is currently maintained at a constant temperature during DCFC, such as 20 degrees Celsius (° C.).

A lower CT may address the issue faced by present BESs by enabling higher currents when at RESS thermal limits. However, utilizing a lower CT from the beginning of the DCFC charge process may introduce condensation and corresponding loss of isolation failures in the RESS under high humidity operating conditions. Additionally, if the battery pack(s) cool down too much, energy gain could be negatively impacted. The present disclosure also addresses these issues.

SUMMARY

Figures 1, 1A:
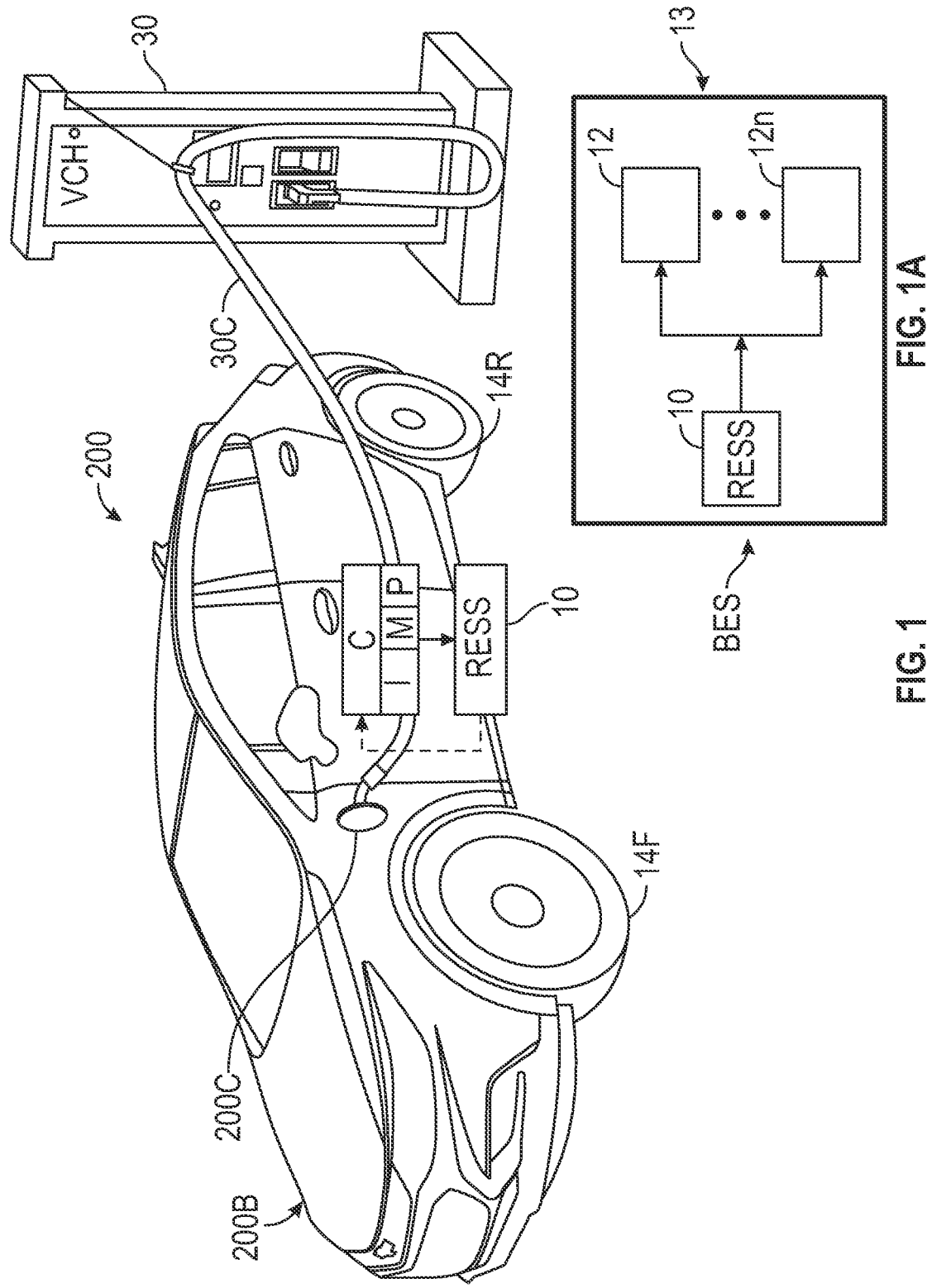
FIG. 1 illustrates a motor vehicle according to an embodiment of the present disclosure that includes a BES equipped with at least one HV battery pack.
FIG. 1A illustrates a BES according to an embodiment of the present disclosure.

The present disclosure provides a method, system, and motor vehicle for controlling a direct-current fast-charging process of a battery system. The method includes setting an initial cooling temperature and performing the direct-current fast-charging process based on the initial cooling temperature with subsequent adjustments in the cooling temperature. The subsequent adjustments include setting a default cooling temperature to a first cooling temperature set point and then setting the cooling temperature by utilizing ambient air temperature, a rechargeable energy storage system cell temperature, a rechargeable energy storage system voltage, a direct-current fast-charging current, and a rechargeable energy storage system state of charge by maintaining the default cooling temperature as the first cooling temperature if the ambient air temperature is not less than a first threshold or the rechargeable energy storage system cell temperature is not greater than a second threshold, setting the cooling temperature to a second cooling temperature set point that is lower than the default cooling temperature if the ambient air temperature is less than the first threshold and the rechargeable energy storage system cell temperature is greater than the second threshold, and setting the cooling temperature to a third cooling temperature set point that is greater than the default cooling temperature if the rechargeable energy storage system voltage is greater than a third threshold and the rechargeable energy storage system state of charge is greater than a fourth threshold and the direct-current fast-charging current is less than a fifth threshold.

The first cooling temperature set point may be 20° C. The second cooling temperature set point may be 15° C. The third cooling temperature set point may be 25° C. or 30° C. The first threshold may be 45° C. The second threshold may be 35° C.

The values of the first cooling temperature set point, second cooling temperature set point, third cooling temperature set point, first threshold, second threshold, third threshold, fourth threshold and fifth threshold may be determined by a type of the electric vehicle.

The values of the third threshold, fourth threshold and fifth threshold may be determined based on the direct-current fast-charging current being limited by lithium plating limits or thermal limits. The values of the third threshold, fourth threshold and fifth threshold may be determined based on the direct-current fast-charging current being limited by voltage limits. The values of the third threshold, fourth threshold and fifth threshold may be determined based on rechargeable energy storage system cell limits. The values of the third threshold, fourth threshold and fifth threshold may be determined based on the direct-current fast-charging current being limited by lithium plating limits or thermal limits, based on the direct-current fast-charging current being limited by voltage limits and based on rechargeable energy storage system cell limits. The values of the first threshold and second threshold may be determined based on rechargeable energy storage system thermal conditions and the surrounding environment conditions.

The electric vehicle includes a vehicle body, road wheels connected to the vehicle body, a battery system including at least one rechargeable battery pack connected to one or more components and a rechargeable energy storage system that is charged by an offboard charging station to which the EV is connected to a direct-current (DC) fast-charging (FC) (DCFC) charging receptacle configured to receive a Vehicle Charging Voltage (VCH) and a control unit configured to control a direct-current fast-charging process for the EV battery system according to the method.

The system includes at least one rechargeable battery pack connected to one or more components and a rechargeable energy storage system that is charged by an offboard charging station to which the EV is connected, where the system includes a control unit performing the method.

DETAILED DESCRIPTION

The present disclosure may be embodied in many different forms. Representative embodiments of the present disclosure are illustrated in the drawings and disclosed herein in detail as non-limiting examples of the disclosure. Disclosure not explicitly recited in the claims, should not be incorporated into the claims, singly or collectively, by implication, inference, or otherwise.

For purposes of the present disclosure, unless specifically disclaimed, use of singular tense includes the plural tense and vice-versa, the terms "and" and "or" shall be both conjunctive and disjunctive, and the words "including," "containing," "comprising," "having," and similar terms shall mean "including without limitation." Moreover, words of approximation such as "about," "almost," "substantially," "generally," "approximately," and similar words may be used herein in to mean "at, near, or nearly at," or "within 0-5% of," or "within acceptable manufacturing tolerances," or logical combinations thereof.

A component disclosed as "configured to perform" or "configured for performing" a specified function is capable of performing the specified function without alteration, rather than merely having potential to perform the specified function after further modification. In other words, the disclosed hardware, when expressly "configured to perform" or "configured for performing" the specified function, is specifically selected, created, implemented, utilized, programmed, and/or designed for the purpose of performing the specified function. In the drawings, like reference numbers refer to the same or similar components.

FIG. 1 illustrates a motor vehicle 200 according to an embodiment of the present disclosure. As illustrated in FIG. 1, the vehicle 200 includes a BES 13 equipped with at least one HV battery pack(s). As further illustrated in FIG. 1, the SCS may be embodied as computer-readable instructions (I) recorded in memory (M) of a control system (C), such as one or more digital computers or electronic control units, and executed by one or more processors (P).

The memory (M) includes tangible, non-transitory memory, e.g., read-only memory, whether optical, magnetic, flash, or other type. The control system (C) also includes application-sufficient amounts of random-access memory, electrically-erasable programmable read-only memory, and similar memory, as well as a high-speed clock, analog-to-digital and digital-to-analog circuitry, and input/output circuitry and devices, as well as appropriate signal conditioning and buffer circuitry.

As further illustrated in FIG. 1, the motor vehicle 200 includes a vehicle body 200B, the vehicle body 200B including a charging receptacle 200C. The BES 13 is operable to power front road wheels 14F and/or rear road wheels 14R, depending on the specific drive configuration of the motor vehicle 200 or other mobile system.

In the charging state illustrated in FIG. 1, the RESS 10 is recharged by a vehicle charging voltage (VCH) from an offboard charging station 30. The VCH is provided to the RESS 10 by the offboard charging station 30 via a charging cable 30C that terminates in a suitable charge connector, such as an SAE J1772 charge connector (not illustrated). When the motor vehicle 200 is connected to the offboard charging station 30, the VCH and a corresponding charging current is utilized to recharge each electrochemical battery cell (not illustrated) of the RESS 10.

The offboard charging station 30 illustrated in FIG. 1 may be configured as a DCFC station, such that the VCH is nominally 300-volts to 400-volts or more. The RESS 10 may be selectively transitioned to a specific configuration to accommodate a lower or higher level of VCH.

FIG. 1A illustrates a BES according to an embodiment of the present disclosure. As illustrated in FIG. 1A, electrical power from a discharge of the RESS 10 is utilized to power a plurality of HV components (12 ... 12n) as part of the BES 13, where "n" is an application-specific integer. For clarity and simplicity, the plurality of HV components 12, ..., 12n is referred to hereinafter as "HV components 12."

As further illustrated in FIG. 1A, the HV components 12 may include, by way of example and not of limitation, one or more power inverters, auxiliary power modules/DC-to-DC voltage converters, onboard charging modules, drive units, and similar elements. The BES 13 may be utilized in the motor vehicle 200 when the motor vehicle 200 is configured as a battery EV or a plug-in hybrid electric vehicle. Other rechargeable systems are envisioned within the scope of the present disclosure and, therefore, the motor vehicle 200 illustrated in FIG. 1 is just one possible implementation of the present disclosure.

The current DCFC cooling strategy applies a constant CT to prevent condensation in the RESS 10 and corresponding failures related to loss of isolation in the RESS 10 under high humidity operating conditions. Lower CTs may improve DCFC performance by enabling higher currents (and related heat generation) when at RESS thermal limits. However, the lower CT may result in condensation and, therefore, loss of isolation failures in the RESS 10 under high humidity operating conditions. The lower CT may also reduce DCFC performance when below the RESS thermal limits because cell lithium plating current limits decrease when lower cell CTs are utilized.

The present disclosure optimizes DCFC charging performance by utilizing a variable CT based on the RESS 10 conditions, including thermal conditions and electrical parameters. The present disclosure applies a lower CT, such as 15° C., when the RESS Cell Temperature (RESSCT) approaches an RESS high temperature limit, such as 35° C. The present disclosure enables the use of higher current without exceeding cell thermal limits. The risk of condensation is mitigated by controlling a time at the low CT based on the RESSCT, RESS Voltage (RESSV), RESS State Of Charge (SOC) (RESS SOC) and DCFC Current (DCFCI). There are no isolation risk concerns when minimizing the cooling time at low CTs.

Figure 2:
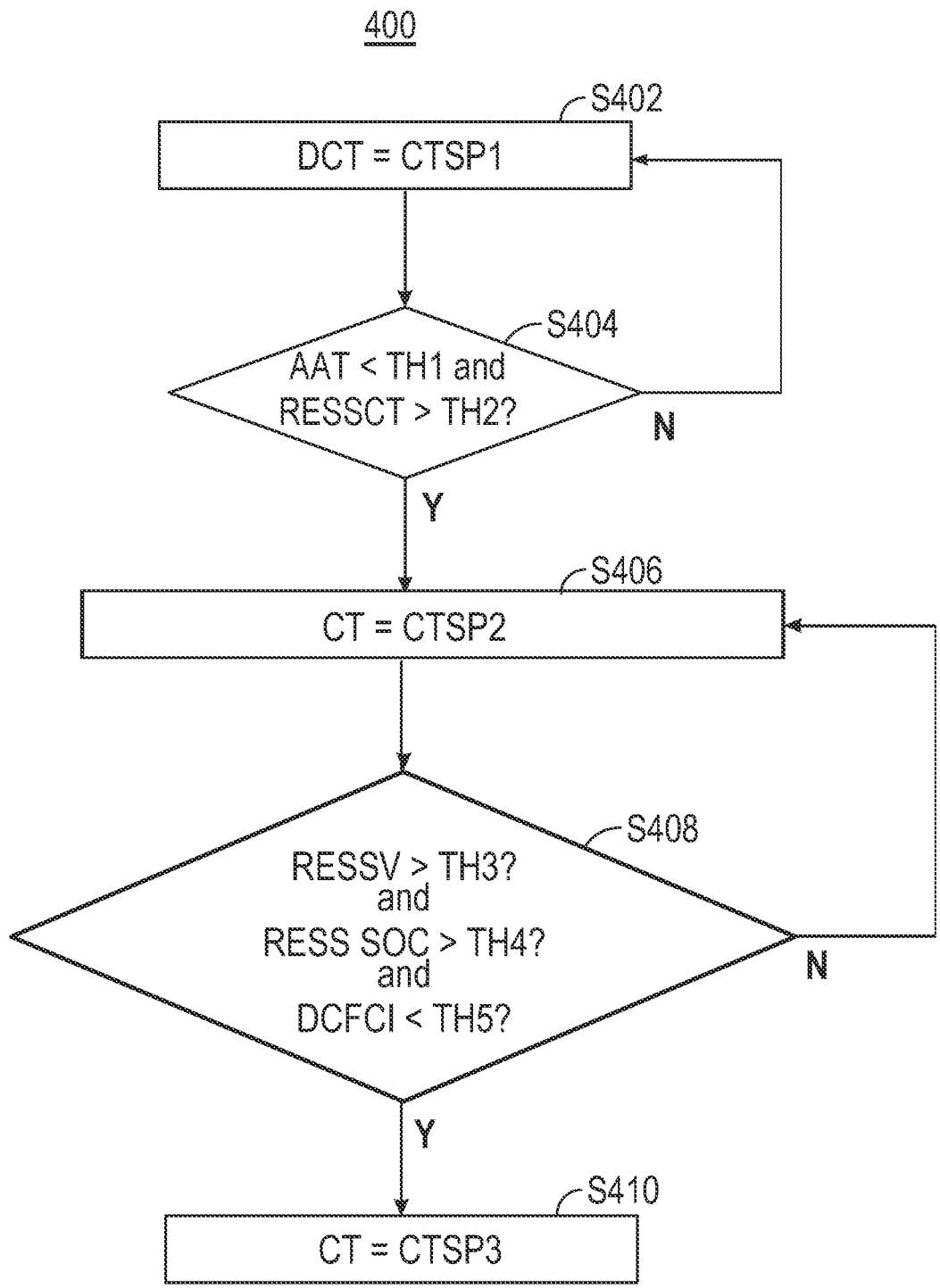
FIG. 2 illustrates a method of varying a CT setpoint according to RESS CT, ambient air temperature, DCFC current, RESS voltage and RESS state of charge according to an embodiment of the present disclosure.

FIG. 2 illustrates a method 400 of varying a CT setpoint according to RESSCT, Ambient Air Temperature (AAT), DCFCI, RESSV, and RESS SOC according to an embodiment of the present disclosure. As illustrated in FIG. 2, the method includes setting a default CT (DCT) to a first CT Set Point (CTSP1) (S402). If the AAT is less than TH1 and the RESSCT is greater than TH2 (S404), the CT is set to a second CTSP (CTSP2) (S406) and, if the AAT is not less than TH1 or the RESSCT is not greater than TH2, the DCT is maintained at CTSP1. The CT is maintained at CTSP2 until it is determined that the RESSV is greater than a third threshold (TH3) and the RESS SOC is greater than a fourth threshold (TH4) and the DCFCI is less than a fifth threshold (TH5) (S408). Once the RESSV is greater than TH3 and the RESS SOC is greater than TH4 and the DCFCI is less than TH5, the CT is set to a third CTSP (CTSP3) (S410).

Figure 3:
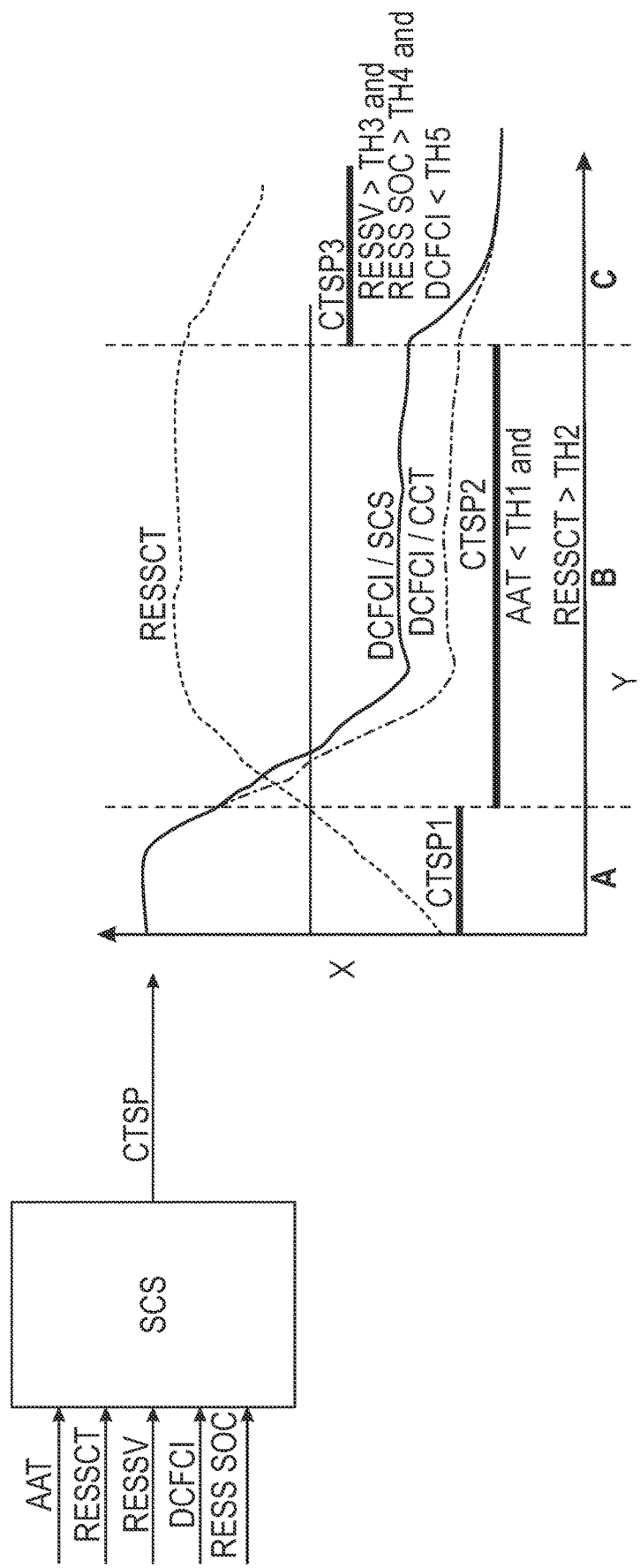
FIG. 3 graphically illustrates the method illustrated in FIG. 2 according to an embodiment of the present disclosure.

FIG. 3 graphically illustrates the method illustrated in FIG. 2 according to an embodiment of the present disclosure. As illustrated in FIG. 3, the SCS according to the present disclosure optimizes DCFC charge energy over time by reducing the CT below the initial CT setpoint (CTSP1), such as 20° C., when the RESSCT reaches a high temperature threshold close to the RESS thermal limit. As illustrated in FIG. 3, the SCS sets the CTSP based on the AAT, RESSCT, RESSV, DCFCI and RESS SOC. It is noted that, in FIG. 3, the "X" axis represents current/temperature and the "Y" axis represents charging time.

Specifically, as illustrated in FIG. 3, CTSP1 is set to a default temperature (DT) at the beginning of the DCFC process in a similar manner as the present cooling strategy. The lower CTSP2, such as 15° C., is utilized when the AAT is less than TH1 and the RESSCT is greater than TH2, such as 35° C., as illustrated in Area (B). A third higher CTSP (CTSP3), such as 25° C. or 30° C., is utilized when the RESSV is greater than TH3 and the RESS SOC is greater than TH4 and the DCFCI is less than TH5, as illustrated in area (C) in FIG. 3. Utilizing the CTSP3 minimizes condensation by managing the time at CTSP2. The values of CTSP2, CTSP3, TH1, TH2, TH3, TH4 and TH5 may be based on different vehicle types.

The higher CTSP3 is utilized when the RESSV is greater than TH3 and the RESS SOC is greater than TH4 and the DCFCI is less than TH5 to further minimize condensation since there is little heat generated by the RESS 10 under these conditions. The benefit of the higher CTSP3 is a time during which condensation can occur at CTSP2 is minimized and the higher CTSP3 helps to evaporate condensation that has occurred.

The thresholds (TH3, TH4, TH5) utilized to set the CTSP3 are determined based on the DCFCI being limited by factors other than Lithium plating limits or thermal limits, such as voltage limits. Raising the CT temp to CTSP3 under these conditions does not negatively affect charge time.

The various thresholds (TH1, TH2, TH3, TH4, TH5) utilized by the SCS are determined in view of the RESS cell limits. A worst case DCFC condition for time at the lower CTSP2 can be determined based on vehicle specific SCS TH controls and low-risk for condensation and isolation loss failures can be verified via high humidity analysis.

FIG. 3 further illustrates a graph of DCFCI temperature sensitivity (TS) versus the CT and RESSCT according to an embodiment of the present disclosure. Specifically, FIG. 3 illustrates a baseline (BL) cooling strategy and an example of the SCS, with the RESSCT for the BL and the SCS, the DCFCI for the BL and SCS, and the CT for the BL and SCS according to the present disclosure. As further illustrated in FIG. 3, the derating of the DCFCI is more severe with a Constant CT than with the SCS of the present disclosure.

As illustrated in FIG. 3, area "A" indicates where the CT is set to the DT (CTSP1). As further illustrated in FIG. 3, Area "B" indicates when the CT is lowered to CTSP2 once the AAT is less than TH1 and the RESSCT is higher than TH2 and illustrates the corresponding derating of the DCFCI. Moreover, as illustrated in FIG. 3, area "C" indicates the derating of the DCFCI due to other limiters of the RESS, such as when the RESSV is greater than a voltage limit. The TH3, TH4 and TH5 are calibrated to correspond with the derating seen in area C. The CT is raised to CTSP3 once RESSV is greater than TH3 and RESS SOC is greater than TH4 and the DCFCI is lower than TH5.

The SCS according to the present disclosure significantly improves DCFC charging performance, specifically energy gain versus time. The SCS according to present disclosure utilizes AAT and RESSCT to determine when to utilize a lower CT when RESSCT is greater than a specific temperature threshold instead of using a lower CT from the beginning of DCFC charging, thereby allowing the battery packs to warm up adequately at the beginning of the charge process and optimize energy gain. The SCS according to present disclosure also minimizes condensation issues by utilizing lower CTs for a short duration when the RESSCT is greater than a specific temperature threshold.

What is claimed is:

1. A method for controlling a direct-current (DC) fast-charging (FC) (DCFC) process of a battery system comprising at least one rechargeable battery pack connected to one or more components and a rechargeable energy storage system (RESS) that is charged by an offboard charging station to which the battery system is connected, the method comprising:
    setting an initial cooling temperature (CT); and
    performing the DCFC process based on the initial CT with subsequent adjustments in the CT, wherein the subsequent adjustments comprise:
        setting a default CT (DCT) to a first CT Set Point (CTSP1); and
        setting the CT by utilizing Ambient Air Temperature (AAT), an RESS Cell Temperature (RESSCT), a RESS Voltage (RESSV), a DCFC current (DCFCI), and a RESS State Of Charge (RESS SOC) by:
            maintaining the DCT as CTSP1 if the AAT is not less than a first threshold (TH1) or the RESSCT is not greater than a second threshold (TH2);
            setting the CT to a second CTSP (CTSP2) that is lower than the DCT if the AAT is less than TH1 and the RESSCT is greater than TH2; and
            setting the CT to a third CTSP (CTSP3) that is greater than the DCT if the RESSV is greater than a third threshold (TH3) and the RESS SOC is greater than a fourth threshold (TH4) and the DCFCI is less than a fifth threshold (TH5).

2. The method of claim 1, wherein:
    CTSP1 is 20° C.;
    CTSP2 is 15° C.;
    CTSP3 is 25° C. or 30° C.;
    TH1 is 45° C.; and
    TH2 is 35° C.

3. The method of claim 1, wherein values of CTSP1, CTSP2, CTSP3, TH1, TH2, TH3, TH4 and TH5 are determined according to an EV in which the battery system is installed.

4. The method of claim 1, wherein values of TH3, TH4 and TH5 are determined based on the DCFCI being limited by lithium plating limits or thermal limits.

5. The method of claim 1, wherein values of TH3, TH4 and TH5 are determined based on the DCFCI being limited by voltage limits.

6. The method of claim 1, wherein values of TH3, TH4 and TH5 are determined based on RESS cell limits.

7. The method of claim 1, wherein values of TH3, TH4 and TH5 are determined based on the DCFCI being limited by lithium plating limits or thermal limits, based on the DCFCI being limited by voltage limits, and based on RESS cell limits.

8. The method of claim 1, wherein values of TH1 and TH2 are determined based on RESS thermal conditions and the surrounding environment conditions.

9. An electric vehicle (EV) comprising:
    a vehicle body;
    road wheels connected to the vehicle body;
    a battery system comprising at least one rechargeable battery pack connected to one or more components and a rechargeable energy storage system (RESS) that is charged by an offboard charging station to which the EV is connected;
    a direct-current (DC) fast-charging (FC) (DCFC) charging receptacle to receive a Vehicle Charging Voltage (VCH); and a control unit configured to control a direct-current (DC) fast-charging (FC) (DCFC) process for the battery system by:
  setting an initial cooling temperature (CT); and
  performing the DCFC process based on the initial CT with subsequent adjustments in the CT, wherein the subsequent adjustments comprise:
    setting a default CT (DCT) to a first CT Set Point (CTSP1); and
    setting the CT by utilizing Ambient Air Temperature (AAT), an RESS Cell Temperature (RESSCT), a RESS Voltage (RESSV), a DCFC current (DCFCI), and a RESS State Of Charge (RESS SOC) by:
      maintaining the DCT as CTSP1 if the AAT is not less than a first threshold (TH1) or the RESSCT is not greater than a second threshold (TH2); and
      setting the CT to a second CTSP (CTSP2) that is lower than the DCT if the AAT is less than TH1 and the RESSCT is greater than TH2; and
      setting the CT to a third CTSP (CTSP3) that is greater than the DCT if the RESSV is greater than a third threshold (TH3) and the RESS SOC is greater than a fourth threshold (TH4) and the DCFCI is less than a fifth threshold (TH5).

10. The EV of claim 9, wherein:
CTSP1 is 20° C.;
CTSP2 is 15° C.;
CTSP3 is 25° C. or 30° C.;
TH1 is 45° C.; and
TH2 is 35° C.

11. The EV of claim 9, wherein values of CTSP1, CTSP2, CTSP3, TH1, TH2, TH3, TH4 and TH5 are determined according to the EV.

12. The EV of claim 9, wherein values of TH3, TH4 and TH5 are determined based on the DCFCI being limited by lithium plating limits or thermal limits.

13. The EV of claim 9, wherein values of TH3, TH4 and TH5 are determined based on the DCFCI being limited by voltage limits.

14. The EV of claim 9, wherein values of TH3, TH4 and TH5 are determined based on RESS cell limits.

15. The EV of claim 9, wherein values of TH3, TH4 and TH5 are determined based on the DCFCI being limited by lithium plating limits or thermal limits, based on the DCFCI being limited by voltage limits, and based on RESS cell limits.

16. A system controlling a direct-current (DC) fast-charging (FC) (DCFC) process of a battery system comprising at least one rechargeable battery pack connected to one or more components and a rechargeable energy storage system (RESS) that is charged by an offboard charging station to which the EV is connected, the system comprising a control unit:
  setting an initial cooling temperature (CT); and
  performing the DCFC process based on the initial CT with subsequent adjustments in the CT, wherein the subsequent adjustments comprise:
    setting a default CT (DCT) to a first CT Set Point (CTSP1); and
    setting the CT by utilizing Ambient Air Temperature (AAT), a temperature of the RESS (RESSCT), a voltage of the RESS (RESSV), a current of the DCFC (DCFCI) and a state of charge (SOC) of the RESS (RESS SOC) by:
      maintaining the DCT as CTSP1 if the AAT is not less than a first threshold (TH1) or the RESSCT is not greater than a second threshold (TH2);
      setting the CT to a second CTSP (CTSP2) that is lower than the DCT if the AAT is less than TH1 and the RESSCT is greater than TH2; and
      setting the CT to a third CTSP (CTSP3) that is greater than the DCT if the RESSV is greater than a third threshold (TH3) and the RESS SOC is greater than a fourth threshold (TH4) and the DCFCI is less than a fifth threshold (TH5).

17. The system of claim 16, wherein:
CTSP1 is 20° C.;
CTSP2 is 15° C.;
CTSP3 is 25° C. or 30° C.;
TH1 is 45° C.; and
TH2 is 35° C.

18. The system of claim 16, wherein values of CTSP1, CTSP2, CTSP3, TH1, TH2, TH3, TH4 and TH5 are determined according to an EV in which the battery system is installed.

19. The system of claim 16, wherein values of TH3, TH4 and TH5 are determined based on the DCFCI being limited by lithium plating limits or thermal limits.

20. The system of claim 16, wherein values of TH3, TH4 and TH5 are determined based on the DCFCI being limited by voltage limits or cell limits.

* * * * *